Dec. 17, 1935.  J. FRANZE  2,024,917
COMBINED FRUIT SQUEEZER AND GRATER
Filed June 12, 1934
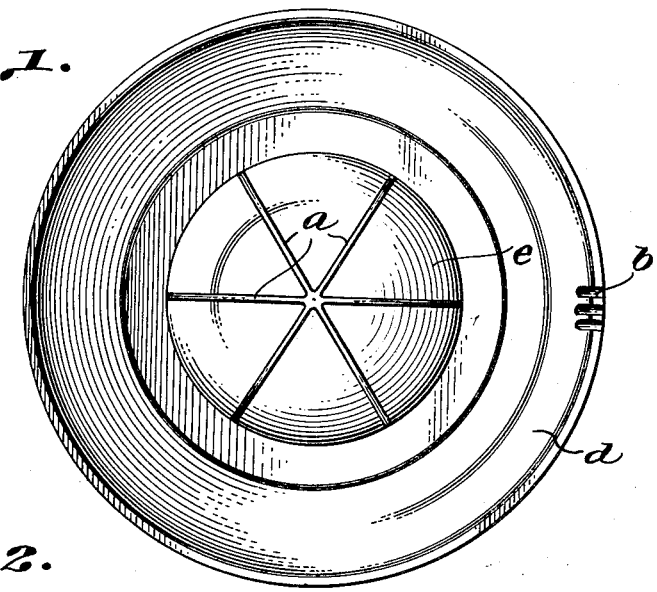
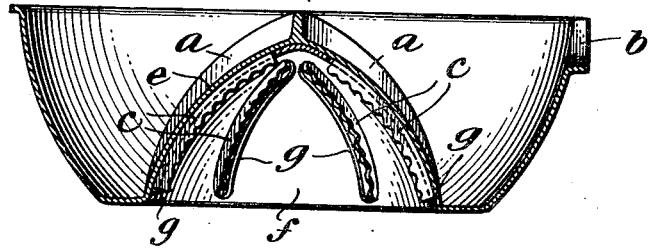
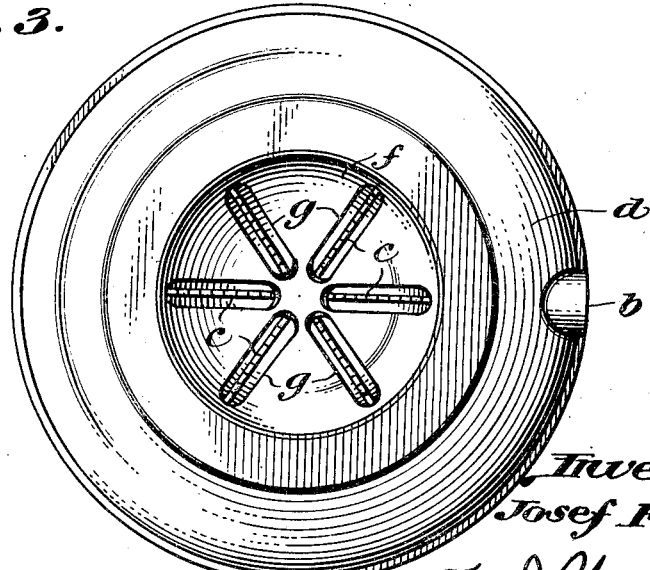
Inventor
Josef Franze
By Ferd. Nusch
Atty.

Patented Dec. 17, 1935

2,024,917

UNITED STATES PATENT OFFICE 2,024,917

COMBINED FRUIT SQUEEZER AND GRATER

Josef Franze, Berlin-Neukolln, Germany

Application June 12, 1934, Serial No. 730,241
In Germany July 10, 1932

1 Claim. (Cl. 146—3)

Application has been filed in Germany, July 10, 1932.

This invention relates to a combined kitchen utensil which enables both the grating and squeezing of all kinds of fruit.

It is known that the skin of lemons, oranges and the like contain aromatic substances and vitamine components which appear to make the skins suitable for use in the kitchen. Hitherto, however, it was very difficult for the housewife to obtain a finely disintegrated skin substance because suitable utensils were lacking. The known graters are of a shape which is extremely unsuitable for working round fruits.

According to the invention the scraping or grating surfaces are arranged in such a manner that they conform to a considerable extent to the shape of the fruit. Consequently the grating off of the skin can be effected not only more quickly but also more completely because all parts of the fruit surface positively come into contact with the grating tools.

The fundamental idea of the invention consists in providing the hollow inner side of the known conical or hemispherical lemon squeezer with devices for grating the peel of fruits of all kinds.

The invention can be carried out in various manners.

An embodiment of the invention is illustrated by way of example in the accompanying drawing, in which:—

Fig. 1 shows the fruit squeezer and grater in top plan view.

Fig. 2 is a longitudinal section of Fig. 1.

Fig. 3 is a bottom plan view of Fig. 1.

The fruit squeezer and grater comprises a cup-shaped vessel $d$ with a spout $b$. The bottom of the vessel is upwardly bulged in known manner and forms a cone $e$ on which ribs $a$ or other suitable projections are arranged for the purpose of facilitating the squeezing. The ribs $a$ may have sharp edges.

Grooved recesses separate the ribs $a$ in the cone and sharp burrs $c$ are stamped on the inner side of the cone. An insert $f$ is preferably inserted from the under side into the cone $e$, which insert has slots $g$ which engage over the burrs $c$. The burrs $c$ are shown serrated but may also be constructed without teeth.

The ribs $a$ may be separate from the cone $e$ and placed thereon. The cone $e$ may also be separately inserted in the vessel $d$ and its lower edge soldered on the edge of a central aperture in the bottom of the vessel.

The shape of the scraping tool may be considerably varied without departing from the scope of the invention. Saw-shaped or spacially curved elements may be employed instead of the stamped construction.

A very practical construction consists for example of a flat band bent in undulations and inserted on edge in the inner side of the cone. In many instances it is also preferable to mutually displace the scraping projections so that all parts of the surface are engaged when the fruit is turned. For example the scraping surfaces may be arranged in a helical line.

A particularly advantageous form of construction is obtained by punching out the vessel $d$ in such a manner that the cone does not project beyond the edge of the vessel. This presents the advantage that, when the vessel is turned upside down, the scraping device on the under side thereof has a flat resting surface, which evidently greatly facilitates the work. This form of construction makes the apparatus a combined squeezer and grater which can be employed with the vessel aperture directed upwards or its edge resting on a support, according to the purpose of use. The ribs $a$ or the like serving for catching the fleshy portions of the fruit are preferably arranged in this instance on the edge of the vessel. This measure greatly facilitates the cleaning of the utensil.

The combined squeezer and grater according to the invention is evidently not restricted to the working of lemons, but it can be employed everywhere where it is a question of squeezing or grating fruits. It is evident that the squeezer may be used for working lemons, bitter and sweet oranges and the like, whereas the scraper on the inner side of the cone $c$ may serve for working other fruits, such as carrots, apples and the like.

I claim:—

A combined fruit squeezer and grater, comprising in combination a cup-shaped vessel, an upwardly projecting hollow cone in the middle of the bottom of said vessel, radial ribs on the outer side of said cone and sharp edged radial ribs projecting from the inner side of said cone, the inner ribs being serrated.

JOSEF FRANZE.